(12) United States Patent
Lyons et al.

(10) Patent No.: US 8,365,392 B2
(45) Date of Patent: Feb. 5, 2013

(54) METHOD OF FABRICATING A ROTOR ASSEMBLY FOR AN ELECTRIC MOTOR

(75) Inventors: David Lyons, Palo Alto, CA (US); Jeffrey B. Straubel, Menlo Park, CA (US); Erik Shahoian, Orinda, CA (US); Rudy Garriga, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 302 days.

(21) Appl. No.: 12/947,851

(22) Filed: Nov. 17, 2010

(65) Prior Publication Data

US 2011/0062819 A1    Mar. 17, 2011

Related U.S. Application Data

(63) Continuation-in-part of application No. 11/452,793, filed on Jun. 13, 2006.

(51) Int. Cl.
*H02K 15/02* (2006.01)
*H02K 15/10* (2006.01)

(52) U.S. Cl. ............................. 29/598; 29/596

(58) Field of Classification Search ............ 29/598, 29/596; 310/42, 54, 156.34, 211, 260, 265
See application file for complete search history.

(56) References Cited

U.S. PATENT DOCUMENTS

| 2,033,059 A | 3/1936 | Williamson |
| 3,924,149 A | 12/1975 | Estrada et al. |
| 4,064,410 A | 12/1977 | Roach |
| 6,088,906 A | 7/2000 | Hsu et al. |

FOREIGN PATENT DOCUMENTS

| JP | 57 028555 A | 2/1982 |
| JP | 58 003553 A | 1/1983 |
| JP | 04 004737 A | 1/1992 |
| JP | 2004 007949 A | 1/2004 |
| JP | 2004 236456 A | 8/2004 |

*Primary Examiner* — Thiem Phan
(74) *Attorney, Agent, or Firm* — Patent Law Office of David G. Beck (57) ABSTRACT

A rotor assembly and a method for fabricating the same are provided in which a solid rotor ring is formed at either end of a stack of laminated discs, the solid rotor rings yielding improved electrical and mechanical characteristics in a low weight assembly. The solid rotor rings are fabricated by brazing slugs between the end portions of the rotor bars, the braze joints contacting a large percentage (at least 90%) of the rotor bar end portions.

10 Claims, 6 Drawing Sheets

METHOD OF FABRICATING A ROTOR ASSEMBLY FOR AN ELECTRIC MOTOR

CROSS-REFERENCE TO RELATED APPLICATION

This application is a continuation-in-part of U.S. patent application Ser. No. 11/452,793, filed Jun. 13, 2006, the disclosure of which is incorporated herein by reference for any and all purposes.

FIELD OF THE INVENTION

The present invention relates generally to electric motors and, more specifically, to an electric motor rotor assembly.

BACKGROUND OF THE INVENTION

AC induction motors are widely used in a variety of industrial and residential applications. In general, this type of motor includes a laminated magnetic core mounted to a drive shaft. The laminated magnetic core may be fabricated from a plurality of laminated magnetic discs, or from a plurality of arc-like core segments. The laminated magnetic core includes a plurality of longitudinal slots into which bars of electrically conductive metal are fit. The ends of the bars extend beyond either end of the laminated magnetic core. An end-ring or end-cap at either end of the laminated magnetic core is used to mechanically and electrically join the ends of the rotor bars.

It will be appreciated that there are numerous techniques that may be used to fabricate the rotor assembly in general and the cap assembly in particular. Typically these techniques make trade-offs between several, often competing, factors that include (i) maximizing the electrical conductivity between the rotor bars; (ii) rotor weight; (iii) material cost; and (iv) fabrication/assembly cost and complexity. One approach that has been used to fabricate the rotor assembly is disclosed in U.S. Pat. No. 3,778,652. As described, a casting process is used to cast aluminum conductor bars in the slots within the laminated magnetic core. To improve the fit between the cast bars and the slots of the core, this patent discloses utilizing projections within the slots, thereby confining and minimizing the shrinkage of the cast bars to small regions. The casting process can be used to cast both the conductor bars and the end rings that electrically couple the bars together.

U.S. Pat. No. 4,064,410 discloses an alternate rotor fabrication process. As disclosed, rotor bars are first inserted into a laminated core such that end portions of each bar protrude beyond the end laminations at either end of the core. An end ring is then positioned over the shaft at either end of the core, the end rings having a plurality of channels on the inner ring surface that are designed to accept the ends of the rotor bars. Welding is then used to fuse the end portions of the rotor bars to the end rings, the welding process being carried out while applying an axial compression of the two rings toward one another.

U.S. Pat. No. 6,088,906 discloses several techniques for forming a joint between the rotor bars that extend beyond the laminated core and the end rings positioned at either end of the rotor assembly. In one of the disclosed techniques, the end rings are rotated about their rotational axes at high speed, and then simultaneously pushed into contact with the ends of the rotor bars. Frictional heating causes the ends of the rotor bars to fuse into the complementary surfaces of the rings. This frictional heating approach may be augmented by applying a high axial current to the end rings. Also disclosed is a technique in which a pulsed current generator is used to heat a foil of a brazing alloy to form a braze joint between the end rings and the ends of the rotor bars.

Japanese Patent Application No. 2003020929 (Publication No. 2004007949) discloses a rotor fabrication technique in which the end rings are formed of multiple, individual arc-like end ring pieces. The end ring pieces are positioned at the ends of the laminated core, between the rotor bars. A rotary tool is used to friction weld the end surfaces of the rotor bars to the end ring pieces.

While the prior art discloses a number of techniques that may be used to fabricate the rotor assembly of an electric motor, these techniques tend to provide inferior electrical conductivity, often while utilizing relatively bulky and weighty end rings. Accordingly, what is needed is a rotor assembly that can be easily fabricated while minimizing rotor weight and maximizing conductivity between rotor bars. The present invention provides such a rotor assembly.

SUMMARY OF THE INVENTION

A rotor assembly and a method for fabricating the same are disclosed which provide a solid rotor ring located at either end of a stack of laminated discs, the solid rotor rings yielding improved electrical and mechanical characteristics in a low weight assembly. The solid rotor rings are fabricated by brazing slugs between the end portions of the rotor bars, the braze joints contacting a large percentage (at least 90%) of the rotor bar end portions.

In one aspect of the invention, a method of fabricating an electric motor rotor assembly is provided, the method comprising the steps of (i) inserting rotor bars into the corresponding slots within a stack of laminated discs, wherein a first portion of the rotor bars extends away from a first end surface of the laminated disc stack and a second portion of the rotor bars extends away from a second end surface of the laminated disc stack; (ii) inserting a first plurality of slugs between adjacent rotor bar surfaces of the first portion of the rotor bars to form a first rotor bar/slug assembly, where the slugs are sized to contact at least 90% (alternately, at least 95%; alternately, at least 99%; alternately, all) of the adjacent rotor bar surfaces; (iii) inserting a second plurality of slugs between adjacent rotor bar surfaces of the second portion of the rotor bars to form a second rotor bar/slug assembly, where the slugs are sized to contact at least 90% (alternately, at least 95%; alternately, at least 99%; alternately, all) of the adjacent rotor bar surfaces; (iv) heating the first rotor bar/slug assembly to form a first plurality of braze joints; and (v) heating the second rotor bar/slug assembly to form a second plurality of braze joints. The first and second rotor bar/slug assemblies may be machined to remove a circumferential edge portion of each assembly. The method may further comprise the steps of fitting containment rings over the machined regions of the first and second rotor bar/slug assemblies. Preferably the rotor bars and first/second pluralities of slugs are fabricated from copper and the brazing material is silver. The heating steps may be performed, for example, in a vacuum furnace or an induction brazing system. Prior to performing the heating steps, at least one loop of a wire may be wrapped around the first and second rotor bar/slug assemblies to insure that the slugs remain in place during brazing.

In another aspect of the invention, an electric motor rotor assembly is provided, the assembly including (i) a rotor shaft; (ii) a plurality of laminated discs formed into a stack, wherein each laminated disc has a plurality of slots, the slots being co-aligned within the stack; (iii) a plurality of rotor bars passing through the slots within the stack and extending out and away from either end of the stack; (iv) a first plurality of slugs interposed between adjacent rotor bar surfaces of a first portion of the rotor bars to form a first rotor bar/slug assembly located on one side of the laminated disc stack, where the slugs are sized to contact at least 90% (alternately, at least 95%; alternately, at least 99%) of the adjacent rotor bar surfaces; and (v) a second plurality of slugs interposed between adjacent rotor bar surfaces of a second portion of the rotor bars to form a second rotor bar/slug assembly located on a second side of the laminated disc stack, where the slugs are sized to contact at least 90% (alternately, at least 95%; alternately, at least 99%) of the adjacent rotor bar surfaces. The assembly may further include first and second containment rings positioned around the first and second rotor bar/slug assemblies, for example over regions of the assemblies that have been machined. The rotor bars may be formed from copper. The slugs may be formed of copper and coated with silver.

A further understanding of the nature and advantages of the present invention may be realized by reference to the remaining portions of the specification and the drawings.

DESCRIPTION OF THE SPECIFIC EMBODIMENTS

Figure 1:
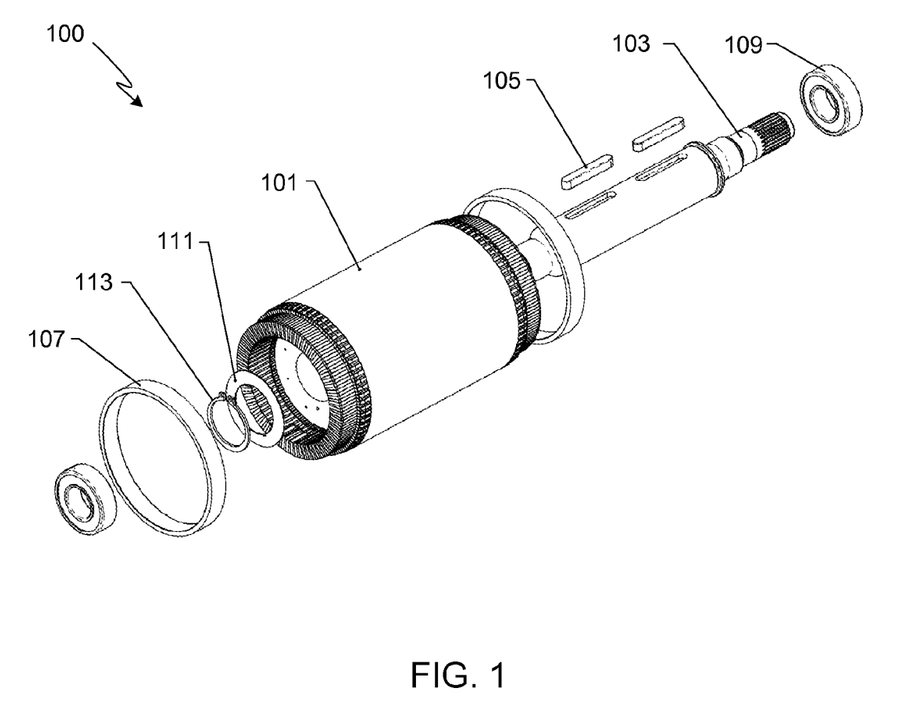
FIG. 1 provides a perspective view of the primary components of a rotor assembly, shown in an exploded relation, in accordance with a preferred embodiment of the invention.

FIG. 1 is an exploded, perspective view of the primary components of a rotor assembly 100 in accordance with a preferred embodiment of the invention. It will be appreciated that other configurations may be used with the invention, and the specific designs and dimensions provided relative to the preferred embodiment are only meant to illustrate, not limit, the invention.

As described in further detail below, the core assembly 101 is comprised of a plurality of laminated discs, a plurality of conductor bars (also referred to herein as rotor bars), and a plurality of slugs that are positioned between, and brazed to, the end portions of the conductor bars. Core assembly 101 is coaxially mounted to a rotor shaft 103, shaft 103 preferably including keys 105, or similar means, for locating and positioning the core assembly about its central axis. At either end of core assembly 101 is a rotor containment ring 107. Additionally, and as shown in FIG. 1, rotor assembly 100 includes ball bearing assemblies 109, washers 111 and retaining rings 113.

Figure 2:
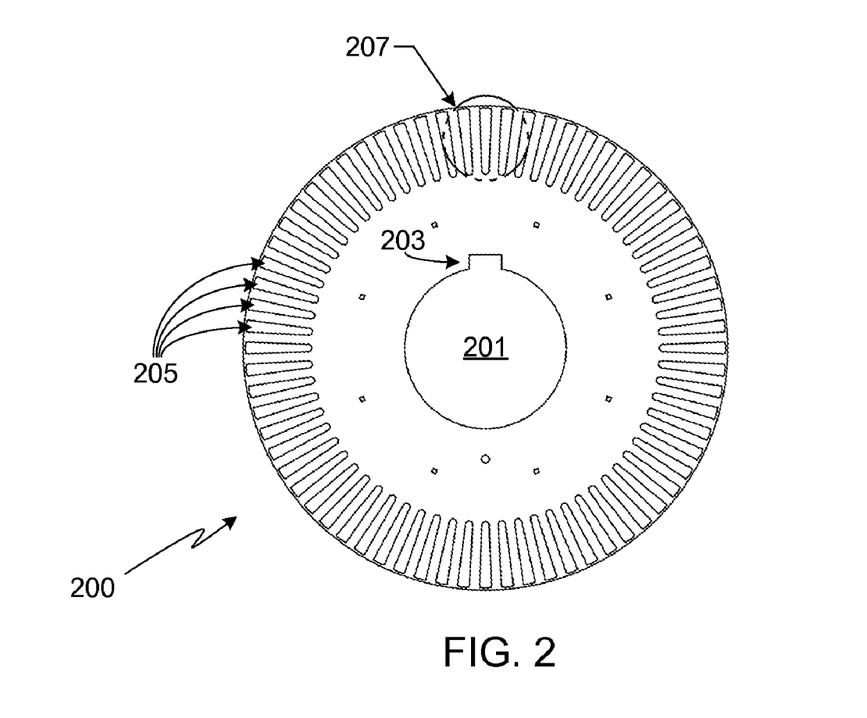
FIG. 2 is an illustration of a laminated disc used in the laminated disc assembly.

FIG. 2 illustrates a single laminated steel disc 200. It will be appreciated that the invention may utilize laminated discs of a different size, with a different number of slots, and with a differently shaped slot design without departing from the invention. A stack of discs 200 form the stack comprising core assembly 101. The center 201 of each disc is removed, for example utilizing a boring or stamping procedure, center 201 sized to fit rotor shaft 103. Preferably each disc 200 includes a slot 203 suitably sized to fit keys 105. As shown, each disc 200 includes a plurality of slots 205, slots 205 having substantially the same shape. In the illustrated embodiment, disc 200 includes 68 equally spaced slots 205. Slots 205 radiate outwards from center 201 and are positioned near the outer edge of disc 200. The discs 200 comprising the laminated core assembly are positioned to insure that the slots in all of the discs are aligned. A detailed view 207 of three slots 205 is provided in FIG. 3.

Figure 3:
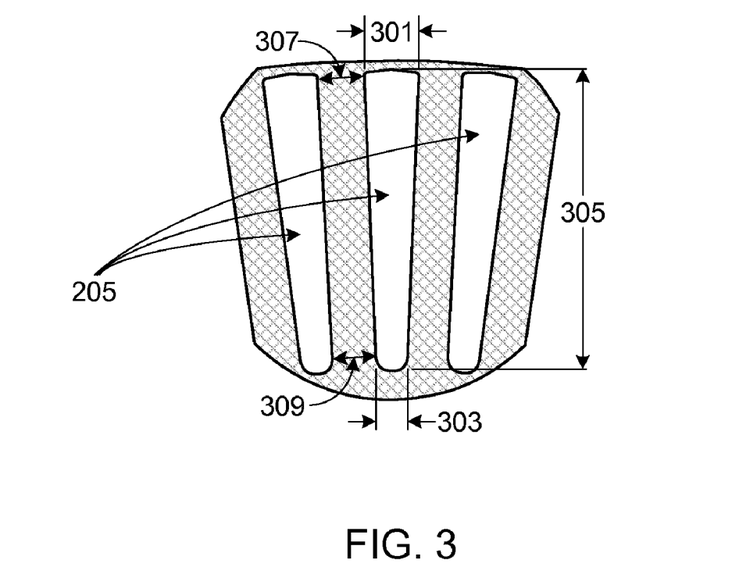
FIG. 3 is a detailed view of three of the slots of the laminated disc shown in FIG. 2.

Slots 205 are generally rectangular in shape. In the preferred embodiment, and as illustrated, each slot 205 has an upper width 301 of 2.97 millimeters, a lower width 303 of 1.75 millimeters and a height 305 of 16.50 millimeters. The outermost edge of slot 205 is 0.5 millimeters from the outer edge of disc 200. The lowermost edge of slot 205 has a radius of curvature of 0.88 millimeters. The uppermost edge of slot 205 is non-planar, as shown. Slot-to-slot spacing is 2.50 millimeters at the upper edge of the slots (i.e., spacing 307), and 2.30 millimeters at the lower edge of the slots (i.e., spacing 309).

Figure 4:
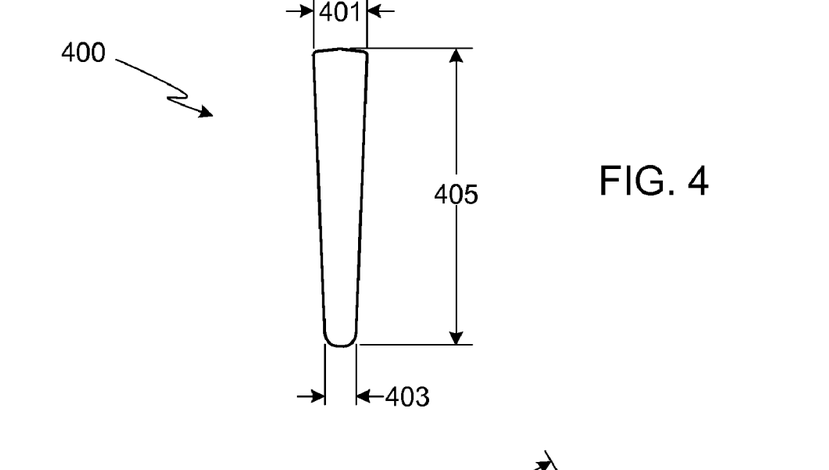
FIG. 4 is a cross-sectional view of a rotor bar suitable for use with the laminated disc shown in FIG. 2.
Figure 5:
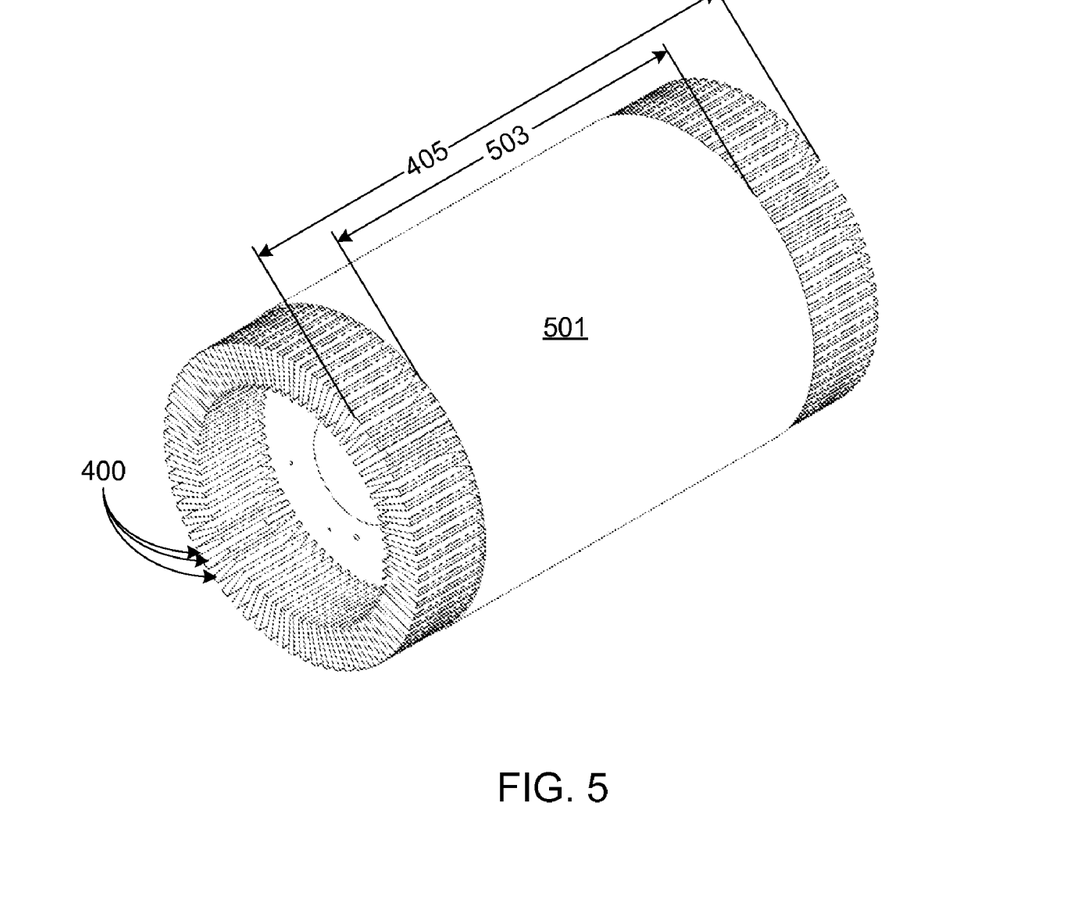
FIG. 5 provides a perspective view of the stack of laminated discs with the rotor bars having been inserted into the assembly.

Core assembly 101 is further comprised of a plurality of rotor bars, the number of rotor bars being equivalent to the number of slots 205 (e.g., 68 in the preferred embodiment). Preferably the rotor bars are extruded from oxygen free copper. FIG. 4 provides a cross-sectional view of a rotor bar 400, illustrating that the rotor bars have substantially the same shape as slots 205, although the dimensions are slightly smaller, thus allowing the bars to be inserted into slots 205. In the preferred embodiment, each bar 400 has an upper width 401 of 2.725 millimeters, a lower width 403 of 1.51 millimeters and a height 405 of 16.26 millimeters. Also in the preferred embodiment, and as illustrated in FIG. 5, the stack of laminated discs 501 has an overall length 503 of 153.3 millimeters while the length 405 of each rotor bar is 214.0 millimeters. Accordingly, in the illustrated embodiment each rotor bar 400 extends out either end of the laminated stack 501 by approximately 30.35 millimeters.

Figure 6:
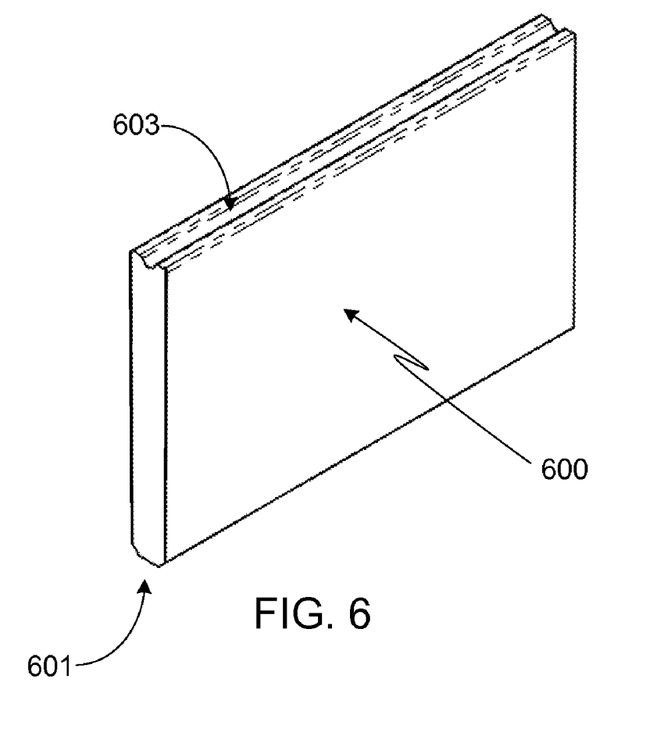
FIG. 6 provides a perspective view of a slug.
Figure 7:
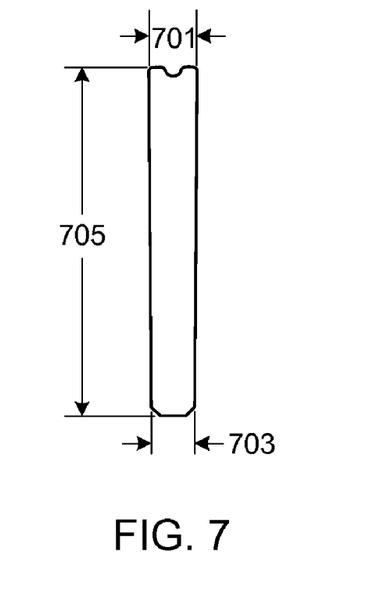
FIG. 7 is a cross-sectional view of the slug shown in FIG. 6.

After assembly of the stack of laminated discs 501 and the insertion of rotor bars 400 into slots 205, the end assemblies are fabricated. The first step in the fabrication of the end assemblies is the insertion of a slug into each gap formed between adjacent rotor bars 400 located at either end of laminated disc stack 501. FIGS. 6 and 7 show perspective and cross-sectional views, respectively, of a slug 600.

Each slug 600 is preferably fabricated from oxygen free copper using, for example, an extrusion process. Preferably the lower portion 601 of each slug 600 is chamfered, thus making it easier to slip the slugs in between adjacent rotor bars. The upper edge 603 preferably includes some form of marking. For example, in the preferred embodiment an artifact of the extrusion process is a groove running along the length of edge 603, as shown. While not required, a groove or other marking simplifies the fabrication process by providing a quick means of determining the proper orientation of the slug prior to insertion into the rotor assembly.

Each slug 600 is coated with a thin film, approximately 0.016 millimeters thick, of silver. It will be appreciated that the coating may be comprised of other suitable brazing materials, e.g., silver alloys. After deposition of the silver film, in the preferred embodiment each slug 600 has an upper width 701 of 2.746 millimeters, a lower width 703 of 2.494 millimeters and a height 705 of 20.00 millimeters. The length of each slug is preferably slightly longer than the amount each rotor bar extends from the stack of laminated disc. Thus, for example, in the preferred embodiment each slug has a length of 31.3 millimeters as compared to the distance the rotor bar extends out of the laminated stack, i.e., 30.35 millimeters.

Figure 8:
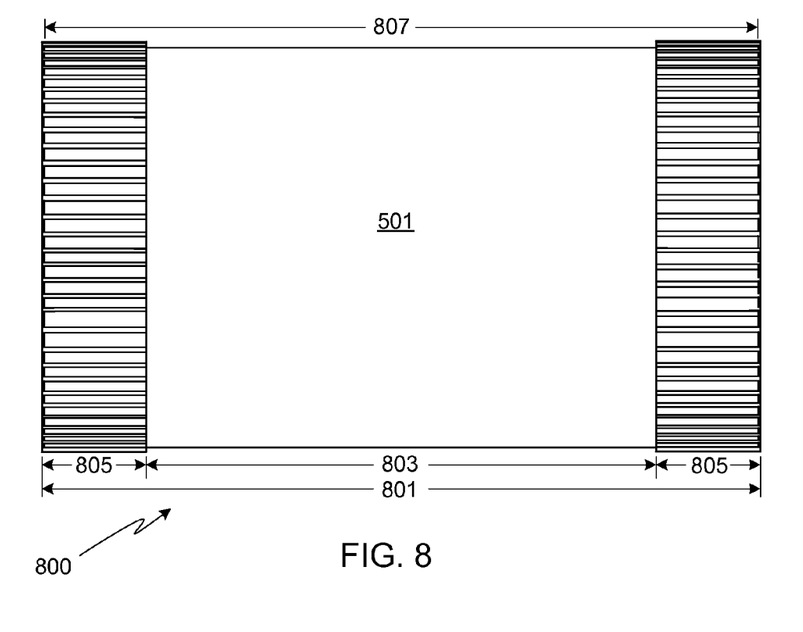
FIG. 8 provides a side view of the rotor core assembly after insertion of the rotor bars into the stack of laminated discs and after placement of the slugs between the ends of the rotor bars.
Figure 9:
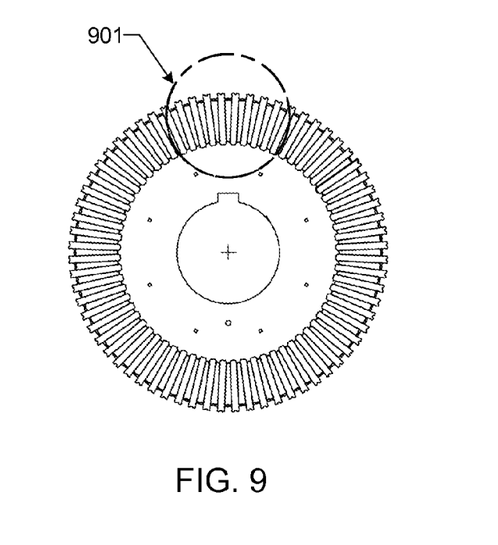
FIG. 9 provides an end view of the assembly shown in FIG. 8.
Figure 10:
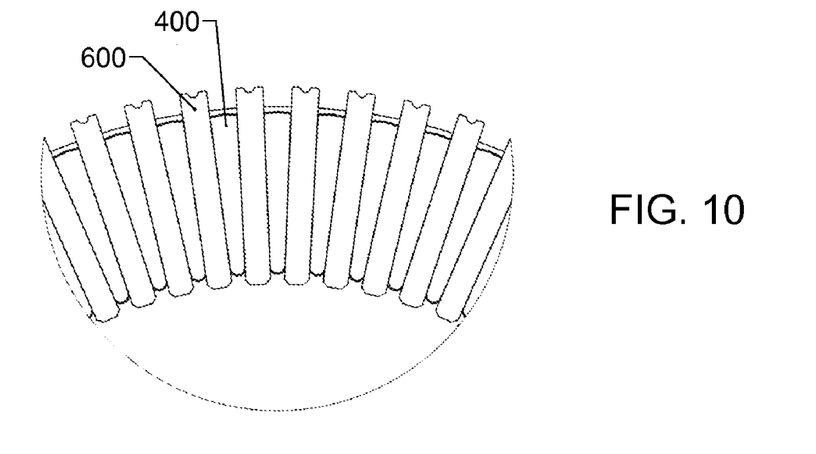
FIG. 10 is a detailed view of a portion of the assembly shown in FIG. 9.

Regardless of the dimensions and the exact shape of the elements of the rotor assembly, e.g., the rotor bars, slugs and laminated discs, preferably the size and shape of the slugs are chosen to insure that the entire side surface of each rotor bar extending away from the laminated stack is in contact with a coated slug surface. Alternately, at least 99% of the side surface of the portion of each rotor that extends away from the laminated stack is in contact with a coated slug surface. Alternately, at least 95% of the surface of the portion of each rotor that extends away from the laminated stack is in contact with a coated slug surface. Alternately, at least 90% of the surface of the portion of each rotor that extends away from the laminated stack is in contact with a coated slug surface. This aspect of the invention is illustrated in FIGS. 8-10. FIG. 8 provides a side view of the rotor core assembly after insertion of the rotor bars 400 into the stack of laminated discs 501 and placement of the slugs 600 between the end portions of the rotor bars. Slugs 600 may be positioned between the rotor bar end portions by hand or utilizing an automated system. As shown, the length 801 of the combination of the laminated stack 501 (length 803) and the slugs 600 (length 805) is slightly longer than the length 807 of rotor bars 400. This preferred configuration insures that the entire length of the portion of each rotor bar that extends out and away from the laminated stack is in contact with a slug. FIG. 9 provides an end view of the assembly shown in FIG. 8. A detailed view 901 of the ends of several rotor bars 400 and the ends of several slugs 600 is provided in FIG. 10. As shown, preferably the dimensions of the slugs, with coating, are selected to insure that the slugs extend completely through the region separating the rotor bars. As a result, and as previously noted, during slug brazing at least 90%, more preferably at least 95%, still more preferably at least 99%, and yet still more preferably 100% of the adjacent surface area of the rotor bars that extend away from the laminated disc stack is in contact with a coated slug.

After slugs 600 are positioned between the adjacent surfaces of the rotor bars, the slugs are brazed. As a result of the brazing operation and the previously described configuration, both ends of the rotor bar assembly are formed into solid rings. It will be appreciated that this configuration offers improved electrical characteristics (i.e., lower rotor bar to rotor bar resistance) and improved strength over a configuration in which only small regions of the end portions of each rotor bar are brazed or welded to a slug or cap assembly. The present configuration also offers lower weight than prior art assemblies utilizing an external cap assembly in which fins of the cap assembly are positioned between adjacent rotor bars.

In a preferred process, the rotor assembly 800 is heated using a conventional furnace to a sufficient temperature and for a sufficient length of time to braze slugs 600 to rotor bars 400. It will be appreciated that by coating each copper slug 600 with silver, as preferred, a separate brazing material is not required. In one embodiment, rotor assembly 800 is brazed in a vacuum furnace. It will be appreciated that while vacuum furnace brazing is preferred, other brazing methods may be employed, e.g., hydrogen furnace brazing, induction brazing, etc.

As the inventors have found that it is generally preferable to allow the slugs to float during the brazing procedure, in a preferred rotor fabrication and assembly process no brazing fixture is used. In an alternate process, a brazing fixture is used, but one that does not impart a significant compressive, radial force on the slugs during the brazing operation. In this process the brazing fixture simply insures that the slugs remain in place during brazing. Thus, for example, in one embodiment a wire (e.g., a stainless steel wire, a molybdenum wire, etc.) is simply wrapped around the circumference of the rotor/slug assembly at either end of the core assembly, the ends of the wire(s) being twist tied to hold the wires and slugs in place during brazing.

As previously noted, the braze joint of the present invention provides a solid rotor ring at either end of the laminated disc stack. As a result, once the assembly has been cooled, the ring at either end of the assembly that is comprised of the ends of the rotor bars and the slugs may be machined to obtain the desired shape and finish. Due to the complete braze joint between the ends of the rotor bars and the adjacent slugs, greater flexibility in machining this region is possible than with the prior art configurations. In the preferred embodiment of the present invention, the rotor bar/slug assembly at either end of the laminated disc stack is machined to (i) lower weight and inertial resistance; (ii) insure concentricity with the rotor shaft; and (iii) balance the rotor assembly. Note that the machining of the assembly may be performed using a lathe, mill, grinder, sander, or other means or combination of means.

Figure 11:
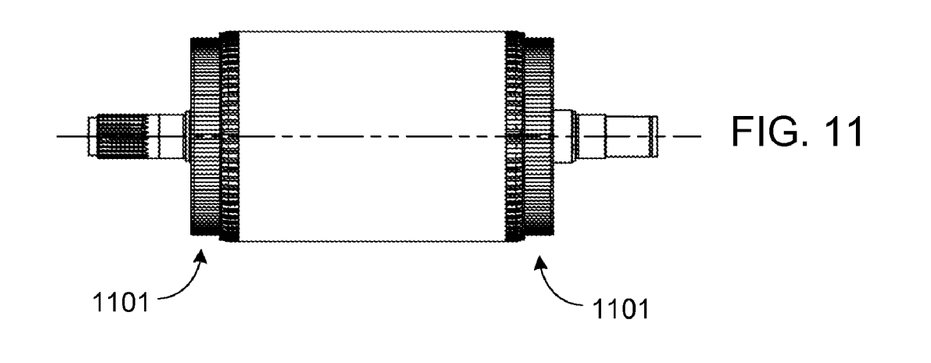
FIG. 11 illustrates the assembly shown in FIG. 8 after brazing and machining.
Figure 12:
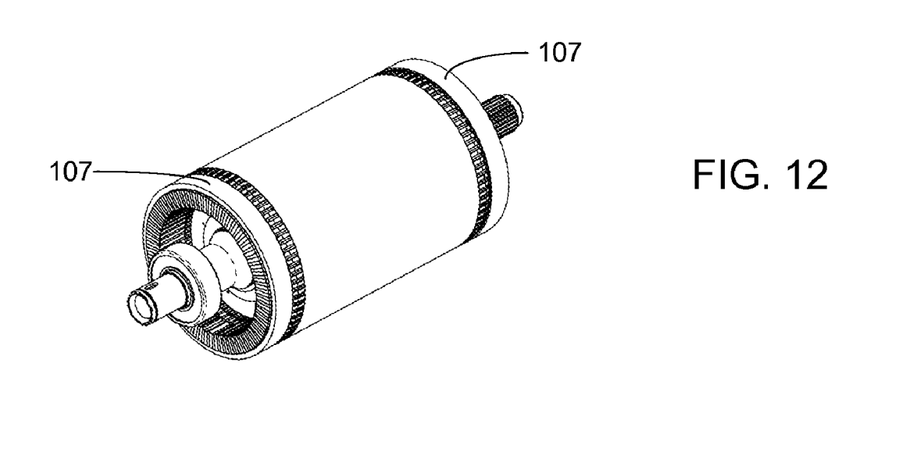
FIG. 12 illustrates the assembly of FIG. 11 after installation of the rotor assembly containment rings.

In the preferred embodiment of the invention, and as illustrated in FIG. 11, a portion 1101 of the rotor bar and slug assembly located at either end of the assembly is removed via machining. Once machined, rotor containments rings 107 are positioned over the ends of the assembly as shown in FIG. 12. Preferably the rotor containment rings are fabricated from stainless steel, although other materials may be used (e.g., beryllium-copper alloys, etc.). Rotor containment rings 107 may be press-fit over the rotor bar/slug assembly in regions 1101, thereby achieving an interference fit. Note that the rotor containment rings may also be soldered, bonded, or welded in place. Additionally, temperature differentials (i.e., containment ring heating and/or assembly cooling) may be used to simplify assembly and/or achieve the desired interference fit.

The remaining portions of the rotor assembly 100 can be finished using conventional rotor components with the finished rotor being used to build a conventional electric motor using conventional techniques.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of fabricating a rotor assembly for an electric motor, the method comprising the steps of:
  inserting a plurality of rotor bars into a corresponding plurality of slots within a stack of laminated discs, wherein a first portion of each of said plurality of rotor bars extends away from a first end surface of said stack of laminated discs, and wherein a second portion of each of said plurality of rotor bars extends away from a second end surface of said stack of laminated discs;

inserting a first plurality of slugs between corresponding adjacent rotor bar surfaces of said first portion of said plurality of rotor bars to form a first rotor bar/slug assembly, wherein each slug of said first plurality of slugs is separate and independent from all other slugs of said first plurality of slugs, wherein each of said first plurality of slugs is sized so that a first and a second slug contact surface contacts at least 90% of said corresponding adjacent rotor bar surfaces of said first portion of said plurality of rotor bars, and wherein said first and second slug contact surfaces of said first plurality of slugs are completely coated with a brazing material;

inserting a second plurality of slugs between corresponding adjacent rotor bar surfaces of said second portion of said plurality of rotor bars to form a second rotor bar/slug assembly, wherein each slug of said second plurality of slugs is separate and independent from all other slugs of said second plurality of slugs, wherein each of said second plurality of slugs is sized so that a first and a second slug contact surface contacts at least 90% of said corresponding adjacent rotor bar surfaces of said second portion of said plurality of rotor bars, and wherein said first and second slug contact surfaces of said second plurality are completely coated with said brazing material;

heating said first rotor bar/slug assembly to form a first plurality of braze joints between said first and second slug contact surfaces of said first plurality of slugs and corresponding adjacent rotor bar surfaces of said first portion of said plurality of rotor bars;

heating said second rotor bar/slug assembly to form a second plurality of braze joints between said first and second slug contact surfaces of said second plurality of slugs and corresponding adjacent rotor bar surfaces of said second portion of said plurality of rotor bars;

machining said first rotor bar/slug assembly to remove a first circumferential edge portion of said first rotor bar/slug assembly, wherein said first circumferential edge portion is comprised of a region of each of said first plurality of slugs and a region of said first portion of said plurality of rotor bars, wherein said first circumferential edge portion is located at an outermost end region of said first rotor bar/slug assembly;

machining said second rotor bar/slug assembly to remove a second circumferential edge portion of said second rotor bar/slug assembly, wherein said second circumferential edge portion is comprised of a region of each of said second plurality of slugs and a region of said second portion of said plurality of rotor bars, wherein said second circumferential edge portion is located at an outermost end region of said second rotor bar/slug assembly;

fitting a first containment ring over said first rotor bar/slug assembly, wherein said first containment ring is positioned on said first rotor bar/slug assembly at a location corresponding to said outermost end region of said first rotor bar/slug assembly where said first circumferential edge portion was removed via said step of machining said first rotor/bar slug assembly; and fitting a second containment ring over said second rotor bar/slug assembly, wherein said second containment ring is positioned on said second rotor bar/slug assembly at a location corresponding to said outermost end region of said second rotor bar/slug assembly where said second circumferential edge portion was removed via said step of machining said second rotor/bar slug assembly.

2. The method of claim 1, wherein said steps of heating said first and second rotor bar/slug assemblies are performed simultaneously.

3. The method of claim 1, further comprising the steps of:
fabricating said plurality of rotor bars from a copper material;
fabricating said first plurality of slugs from said copper material;
fabricating said second plurality of slugs from said copper material; and
selecting silver as said brazing material.

4. The method of claim 1, further comprising the steps of:
fabricating said plurality of rotor bars from a copper material;
fabricating said first plurality of slugs from said copper material;
coating said first plurality of slugs with silver;
fabricating said second plurality of slugs from said copper material; and
coating said second plurality of slugs with silver.

5. The method of claim 1, wherein each of said first plurality of slugs is sized so that said first and second slug contact surfaces contact at least 95% of said corresponding adjacent rotor bar surfaces of said first portion of said plurality of rotor bars, and wherein each of said second plurality of slugs is sized so that said first and second slug contact surfaces contact at least 95% of said corresponding adjacent rotor bar surfaces of said second portion of said plurality of rotor bars.

6. The method of claim 1, wherein each of said first plurality of slugs is sized so that said first and second slug contact surfaces contact at least 99% of said corresponding adjacent rotor bar surfaces of said first portion of said plurality of rotor bars, and wherein each of said second plurality of slugs is sized so that said first and second slug contact surfaces contact at least 99% of said corresponding adjacent rotor bar surfaces of said second portion of said plurality of rotor bars.

7. The method of claim 1, wherein each of said first plurality of slugs is sized so that said first and second slug contact surfaces contact all of said corresponding adjacent rotor bar surfaces of said first portion of said plurality of rotor bars, and wherein each of said second plurality of slugs is sized so that said first and second slug contact surfaces contact all of said corresponding adjacent rotor bar surfaces of said second portion of said plurality of rotor bars.

8. The method of claim 1, wherein said steps of heating said first and second rotor bar/slug assemblies are performed in a vacuum furnace.

9. The method of claim 1, wherein said steps of heating said first and second rotor bar/slug assemblies are performed using an induction brazing system.

10. The method of claim 1, further comprising the steps of:
wrapping at least one loop of a first wire around said first rotor bar/slug assembly prior to said step of heating said first rotor bar/slug assembly, wherein said at least one loop of said first wire insures that said first plurality of slugs remain in place during said heating step; and
wrapping at least one loop of a second wire around said second rotor bar/slug assembly prior to said step of heating said second rotor bar/slug assembly, wherein said at least one loop of said second wire insures that said second plurality of slugs remain in place during said heating step.

* * * * *